(12) United States Patent
Thiyagarajan (10) Patent No.: US 10,827,903 B2
(45) Date of Patent: Nov. 10, 2020

(54) DISHWASHER APPLIANCE WITH A FINE FILTER

(71) Applicant: Haier US Appliance Solutions, Inc., Wilmington, DE (US)

(72) Inventor: Ramasamy Thiyagarajan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 292 days.

(21) Appl. No.: 15/890,474

(22) Filed: Feb. 7, 2018

(65) Prior Publication Data

US 2019/0239715 A1    Aug. 8, 2019

(51) Int. Cl.
*A47L 15/42* (2006.01)
*B08B 3/14* (2006.01)
*B01D 29/64* (2006.01)
*B01D 29/33* (2006.01)

(52) U.S. Cl.
CPC ....... *A47L 15/4206* (2013.01); *A47L 15/4202* (2013.01); *B01D 29/33* (2013.01); *B01D 29/6415* (2013.01); *B01D 29/6476* (2013.01); *B08B 3/14* (2013.01)

(58) Field of Classification Search
CPC . A47L 15/4206; A47L 15/4202; B01D 29/33; B01D 29/6415; B01D 29/5476; B08B 3/14
USPC ........................................................ 134/111
See application file for complete search history.

(56) References Cited

U.S. PATENT DOCUMENTS

| 8,707,973 | B2 | 4/2014 | Yoon et al. |
| 9,005,369 | B2 | 4/2015 | Delgado et al. |
| 2010/0154841 | A1* | 6/2010 | Fountain ............. A47L 15/4204 134/104.2 |
| 2011/0056527 | A1* | 3/2011 | Classen ............... A47L 15/4221 134/56 D |

FOREIGN PATENT DOCUMENTS

| DE | 4131914 A1 | 4/1993 |
| EP | 0752231 B1 | 1/2002 |
| KR | 101016311 B1 | 2/2011 |

* cited by examiner

*Primary Examiner* — Tinsae B Ayalew
(74) *Attorney, Agent, or Firm* — Dority & Manning, P.A.

(57) ABSTRACT

A dishwasher appliance includes a filter assembly positioned between a pump and a spray body along a flow path between the pump and the spray body. The filter assembly includes a cylindrical filter medium positioned within a housing proximate an inlet of the housing. A plurality of vanes is distributed around the cylindrical filter medium. The plurality of vanes is rotatable about the cylindrical filter medium.

19 Claims, 6 Drawing Sheets

DISHWASHER APPLIANCE WITH A FINE FILTER

FIELD OF THE INVENTION

The present subject matter relates generally to dishwasher appliances and filters for dishwasher appliances.

BACKGROUND OF THE INVENTION

During wash and rinse cycles, dishwashers typically circulate a fluid through a wash chamber over articles such as pots, pans, silverware, and other cooking utensils. The fluid can be, e.g., various combinations of water and detergent during the wash cycle or water (which may include additives) during the rinse cycle. Typically the fluid is recirculated during a given cycle using a pump. Fluid is collected at or near the bottom of the wash chamber and pumped back into the chamber through, e.g., nozzles in the spray arms and other openings that direct the fluid against the articles to be cleaned or rinsed.

Depending upon the level of soil upon the articles, fluids used during wash and rinse cycles will become contaminated with soils in the form of debris or particles that are carried with the fluid. In order to protect the pump and recirculate the fluid through the wash chamber, it is beneficial to filter the fluid so that relatively clean fluid is applied to the articles in the wash chamber and materials are removed or reduced from the fluid supplied to the pump.

For mechanical filtration, the selectivity of the filter to remove soil particles of different sizes is typically determined by providing fluid paths (such as pores or apertures) through filter media that are smaller than the particles for which filtration is desired. Particles having a dimension larger than the width of the fluid paths will be trapped or prevented from passing through the filter while particles smaller than the width of the fluid path will generally pass through. Some particle sizes and/or types may be not harmful to the pump or spray assemblies and, therefore, can be allowed to pass into the pump inlet. However, while some smaller particles may not be harmful to the pump, leaving such particles in the wash or rinse fluid may not be acceptable as these particles may become deposited on the articles being washed/rinsed and thereby affect the user's perception of the cleanliness and/or appearance.

While larger particles can generally be readily removed from the fluid circulated through the wash chamber, challenges are presented in removing smaller particles—particularly as the particle size targeted for removal decreases. For example, if a dishwashing appliance is provided with a fine particle filter—such as one for removing particles two hundred (200) microns or larger—the filter can be prone to clogging particularly during the early stages of the cleaning process. During a pre-wash cycle or early stage of a wash cycle, a greater amount of larger food particles may be present on the articles placed in the wash chamber. A fine particle filter—such as one for removing particles two hundred microns or larger—may become clogged.

When a filter clogs, flow of the fluid to the dishwasher's pump is interrupted, and the pump can "starve" and not flow fluid. Operating the pump in such a manner can decrease the pump's operating lifetime and have other negative effects. Accordingly, a dishwasher appliance having filtering system for the removal of particles from the wash fluid would be useful. More particularly, a dishwasher appliance having filtering system for the removal of particles from the wash fluid while that also includes features for limiting clogging of the filtering system would be useful.

BRIEF DESCRIPTION OF THE INVENTION

The present subject matter provides a dishwasher appliance a filter assembly positioned between a pump and a spray body along a flow path between the pump and the spray body. The filter assembly includes a cylindrical filter medium positioned within a housing proximate an inlet of the housing. A plurality of vanes is distributed around the cylindrical filter medium. The plurality of vanes is rotatable about the cylindrical filter medium. Additional aspects and advantages of the invention will be set forth in part in the following description, or may be apparent from the description, or may be learned through practice of the invention.

In a first example embodiment, a dishwasher appliance includes a tub that defines a wash chamber. A spray body is positioned within the wash chamber of the tub. A pump is operable to flow wash fluid to the spray body. A filter assembly is positioned between the pump and the spray body along a flow path between the pump and the spray body. The filter assembly includes a housing that defines an inlet and a recirculation outlet. The inlet of the housing is coupled to the pump such that unfiltered wash fluid from the pump enters the housing at the inlet of the housing during operation of the pump. The recirculation outlet of the housing is coupled to the spray body such that filtered wash fluid exits the housing towards the spray body at the recirculation outlet of the housing during operation of the pump. A cylindrical filter medium is positioned within the housing proximate the inlet of the housing. A plurality of vanes is distributed around the cylindrical filter medium. The plurality of vanes is rotatable about the cylindrical filter medium.

In a second example embodiment, a dishwasher appliance includes a tub that defines a wash chamber. A spray body is positioned within the wash chamber of the tub. A pump is operable to flow wash fluid to the spray body. A filter assembly is positioned between the pump and the spray body along a flow path between the pump and the spray body. The filter assembly includes a housing that defines an inlet and a recirculation outlet. The inlet of the housing is coupled to the pump such that unfiltered wash fluid from the pump enters the housing at the inlet of the housing during operation of the pump. The recirculation outlet of the housing is coupled to the spray body such that filtered wash fluid exits the housing towards the spray body at the recirculation outlet of the housing during operation of the pump. A cylindrical filter medium is mounted within the housing proximate the inlet of the housing such that the cylindrical filter medium is fixed relative to the housing. The cylindrical filter medium defines a plurality of holes that extend through the cylindrical filter medium. Each of the plurality of holes is sized for filtering particles in a range between no less than fifty microns and no greater than six hundred microns. A plurality of vanes is distributed around the cylindrical filter medium. The plurality of vanes is rotatable about the cylindrical filter medium.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
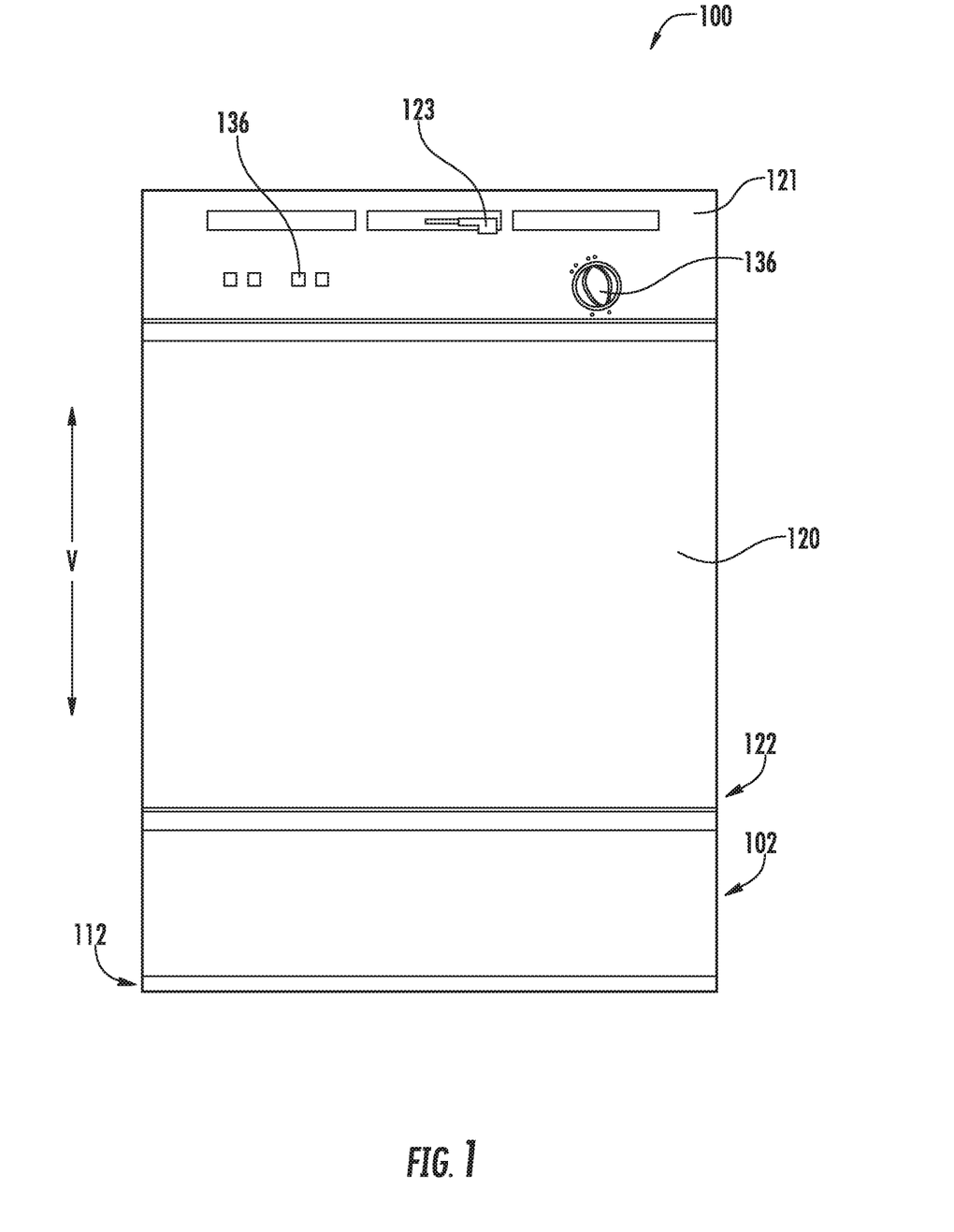
FIG. 1 is a front elevation view of a dishwasher appliance in accordance with an example embodiment of the present subject matter.
Figure 2:
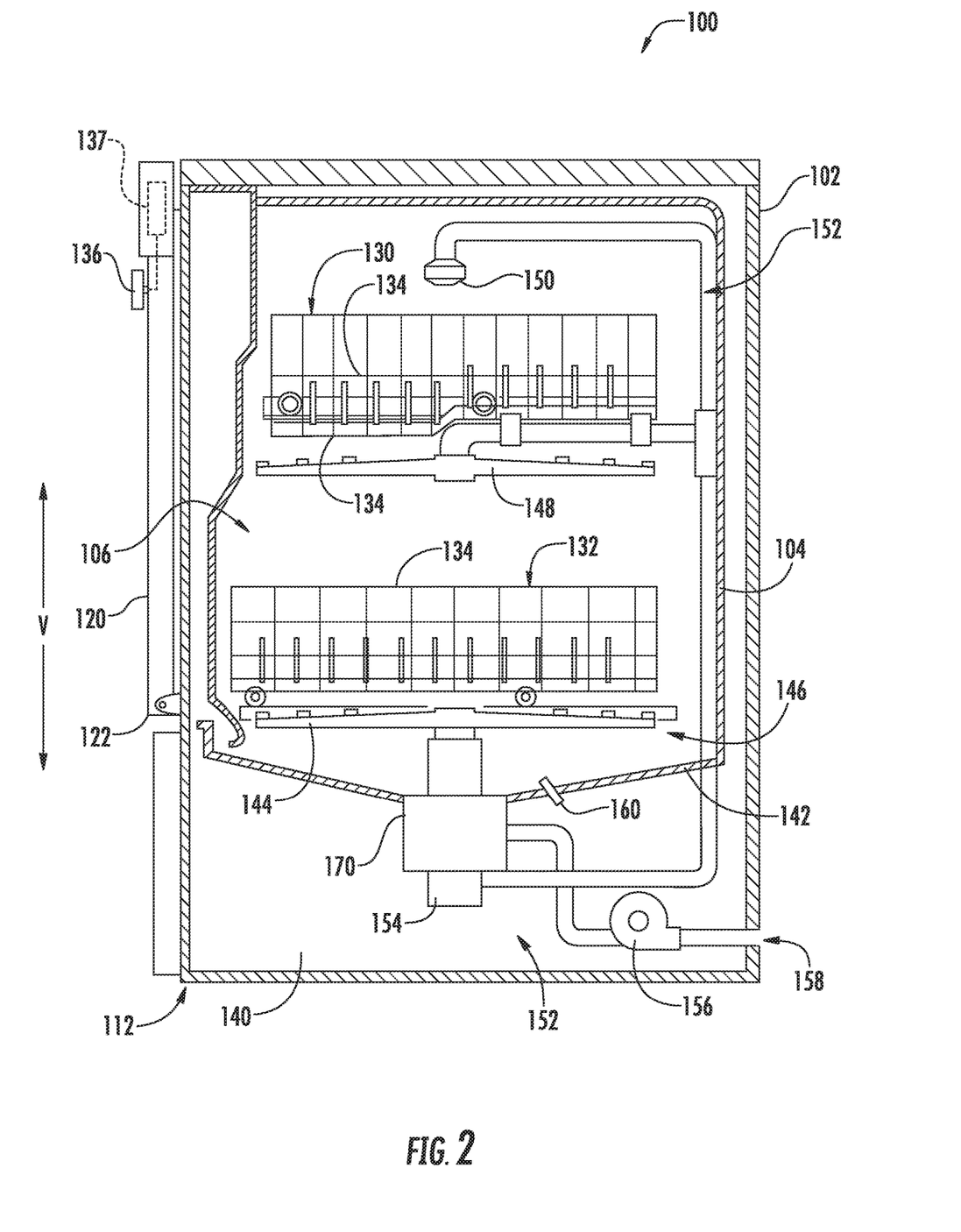
FIG. 2 is a side, sectional view of the example dishwasher appliance of FIG. 1.

FIGS. 1 and 2 depict a dishwasher appliance 100 according to an example embodiment of the present subject matter. FIG. 1 provides a front view of dishwasher appliance 100, and FIG. 2 provides a side, sectional view of dishwasher appliance 100. As shown, dishwasher appliance 100 defines a vertical direction V and includes a cabinet 102. Cabinet 102 has a tub 104 therein that defines a wash chamber 106. The tub 104 also defines a front opening (not shown). Dishwasher appliance 100 includes a door 120 hinged at a bottom 122 of door 120 for movement between a normally closed, vertical position (shown in FIGS. 1 and 2), wherein wash chamber 106 is sealed shut for washing operation, and a horizontal, open position for loading and unloading of articles from dishwasher appliance 100. A latch 123 is used to lock and unlock door 120 for access to wash chamber 106.

Tub 104 includes a sump 170 positioned adjacent a bottom portion 112 of tub 104 and configured for receipt of a liquid wash fluid (e.g., water, detergent, wash fluid, and/or any other suitable fluid) during operation of dishwasher appliance 100. More particularly, sump 170 is shown attached to a bottom wall 142 of tub 104. As will be explained in greater detail below, the exemplary dishwasher appliance 100 may further include a filter assembly, such as a filter assembly 200 (FIG. 3), that filters fluid from sump 170.

A spout 160 is positioned adjacent sump 170 of dishwasher appliance 100. Spout 160 is configured for directing liquid into sump 170. Spout 160 may receive liquid from, e.g., a water supply (not shown) or any other suitable source. In alternative embodiments, spout 160 may be positioned at any suitable location within dishwasher appliance 100, e.g., such that spout 160 directs liquid into tub 104. Spout 160 may include a valve (not shown) such that liquid may be selectively directed into tub 104.

Rack assemblies 130 and 132 are slidably mounted within wash chamber 106. Each of the rack assemblies 130 and 132 is fabricated into lattice structures including a plurality of elongated members 134. Each rack of the rack assemblies 130 and 132 is adapted for movement between an extended loading position (not shown) in which the rack is substantially positioned outside the wash chamber 106, and a retracted position (shown in FIGS. 1 and 2) in which the rack is located inside the wash chamber 106. A silverware basket (not shown) may be removably attached to rack assembly 132 for placement of silverware, utensils, and the like, that are otherwise too small to be accommodated by the racks 130 and 132.

Dishwasher appliance 100 further includes a lower spray body 144 that is rotatably mounted within a lower region 146 of the wash chamber 106 and above sump 170 so as to rotate in relatively close proximity to rack assembly 132. A mid-level spray body 148 is located in an upper region of the wash chamber 106 and may be located in close proximity to upper rack 130. Additionally, an upper spray body 150 may be located above the upper rack 130.

The lower and mid-level spray bodies 144 and 148 and the upper spray body 150 are fed by a fluid circulation assembly 152 for circulating water and/or dishwasher fluid (collectively, "wash fluid") in the tub 104. Fluid circulation assembly 152 may include a wash or circulation pump 154 and a drain pump 156 located in a machinery compartment 140 located below sump 170 of the tub 104, as generally recognized in the art. Drain pump 156 is configured for urging wash fluid within sump 170 out of tub 104 and dishwasher appliance 100 to a drain 158. Circulation pump 154 is configured to provide a flow of recirculated wash fluid to tub 104 and wash chamber 106. More particularly, circulation pump 154 is configured for supplying a flow of wash fluid from sump 170 to spray bodies 144, 148 and 150 via a plurality of circulation conduits (not labeled).

Each spray body 144 and 148 includes an arrangement of discharge ports or nozzles for directing wash fluid onto dishes or other articles located in rack assemblies 130 and 132. The arrangement of the discharge ports in spray bodies 144 and 148 provides a rotational force by virtue of wash fluid flowing through the discharge ports. The resultant rotation of the lower spray body 144 provides coverage of dishes and other dishwasher contents with a spray of wash fluid.

Dishwasher appliance 100 is further equipped with a controller 137 (shown in phantom) to regulate operation of the dishwasher appliance 100. Controller 137 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 137 may be positioned in a variety of locations throughout dishwasher appliance 100. In the illustrated embodiment, controller 137 may be located within a control panel area 121 of door 120 as shown. In such an embodiment, input/output ("I/O") signals may be routed between the control system and various operational components of dishwasher appliance 100 along wiring harnesses that may be routed through the bottom 122 of door 120. Typically, controller 137 includes a user interface 136 through which a user may select various operational features and modes and monitor progress of the dishwasher appliance 100. In one embodiment, user interface 136 may represent a general purpose I/O ("GPIO") device or functional block. Additionally or alternatively, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication with controller 137 via one or more signal lines or shared communication busses.

It should be appreciated that the subject matter disclosed herein is not limited to any particular style, model or configuration of dishwasher appliance, and that the embodiment depicted in FIGS. 1 and 2 is for illustrative purposes only. For example, instead of the racks 130 and 132 depicted in FIG. 1, dishwasher appliance 100 may be of a known configuration that utilizes drawers that pull out from the cabinet and are accessible from the top for loading and unloading of articles.

Figure 3:
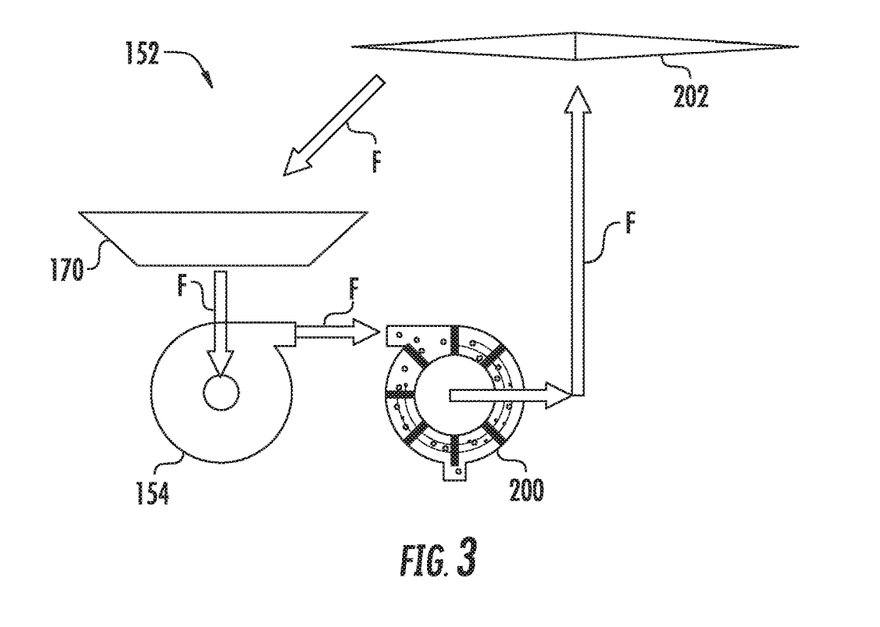
FIG. 3 is a schematic view of a fluid circulation assembly of the example dishwasher appliance of FIG. 1.

FIG. 3 is a schematic view of fluid circulation assembly 152. As may be seen in FIG. 3, fluid circulation assembly 152 includes a filter assembly 200. Collectively, circulation pump 154, sump 170, filter assembly 200 and a spray body 202 (e.g., one of spray bodies 144, 148 and 150) within tub 104 may form a flow path for wash fluid within fluid circulation assembly 152, as shown with the arrows F in FIG. 3. Thus, e.g., circulation pump 154 may be activated during a wash cycle or rinse cycle of dishwasher appliance 100. When activated, circulation pump 154 draws the wash fluid from sump 170 and urges the wash fluid towards filter assembly 200. Thus, circulation pump 154 is operable to draw liquid from sump 170 to or towards circulation pump 154. After flowing through filter assembly 200, the wash fluid may flow to spray body 202 where the wash fluid may be applied to articles within wash chamber 106 in tub 104. The wash fluid within tub 104 may collect within sump 170, and the above described flow path may be repeated to suitably wash and/or rinse the articles within wash chamber 106.

As noted above, filter assembly 200 forms a portion of the flow path for wash fluid within fluid circulation assembly 152. In particular, filter assembly 200 may be positioned between circulation pump 154 and spray body 202 along the flow path F between circulation pump 154 and spray body 202. Thus, filter assembly 200 may be positioned downstream of circulation pump 154 and upstream of spray body 202 along the flow path F between circulation pump 154 and spray body 202

Filter assembly 200 may remove particles (labeled "P") from the wash fluid flowing between circulation pump 154 and spray body 202. In such a manner, filter assembly 200 may improve performance of dishwasher appliance 100, e.g., by reducing reapplication of the particles onto articles within wash chamber 106 and/or by reducing clogging of ports on spray body 202. As discussed in greater detail below, filter assembly 200 may include features for "fine-filtering" the wash fluid flowing between circulation pump 154 and spray body 202. In particular, filter assembly 200 may be configured for complete or one-hundred percent (100%) fine filtration of wash fluid flowing to spray body 202.

Figure 4:
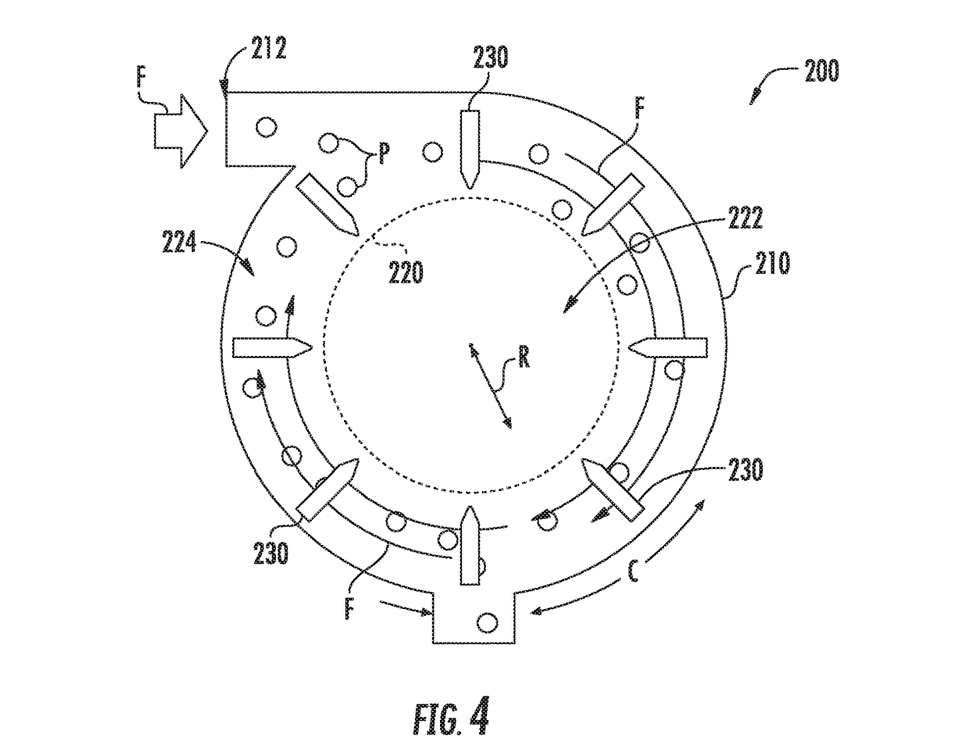
FIGS. 4 and 5 are schematic views of a filter assembly of the example dishwasher appliance of FIG. 1.
Figure 5:
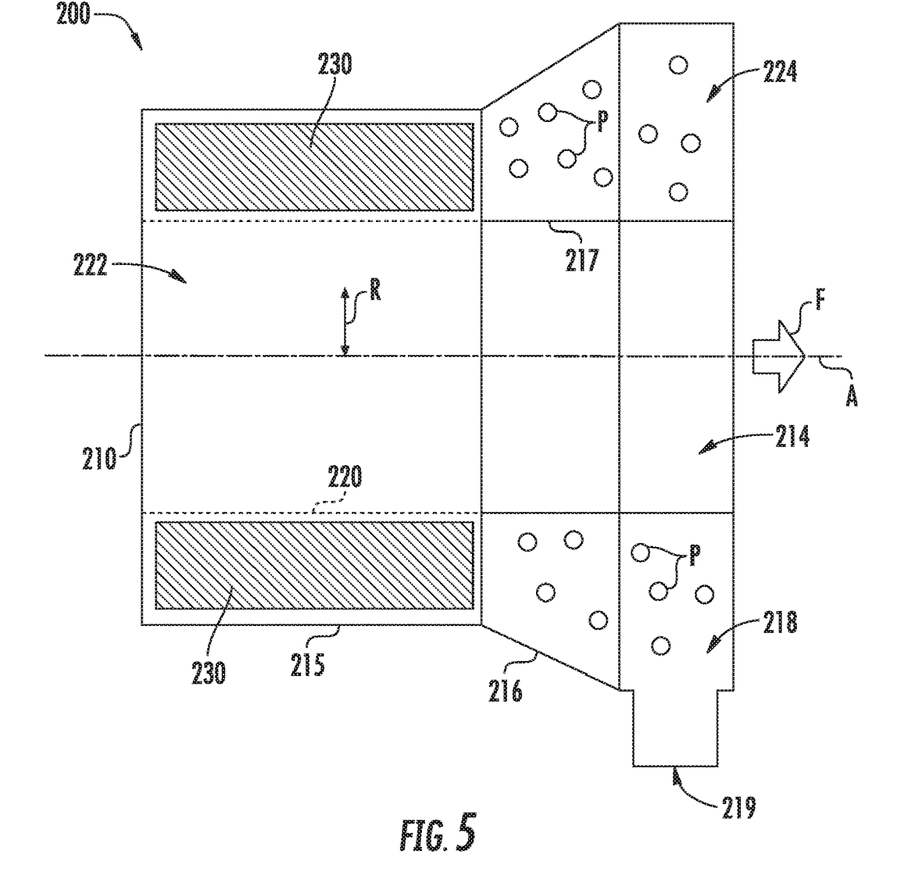

FIGS. 4 and 5 are schematic views of filter assembly 200. As may be seen in FIGS. 4 and 5, filter assembly 200 includes a housing 210 and a filter medium 220. Filter medium 220 is positioned within housing 210. In particular, filter medium 220 may divide an interior of housing 210 into an unfiltered volume 222 and a filtered volume 224. Filter medium 220 is disposed between filtered volume 222 and unfiltered volume 224. As used herein, the term "unfiltered" describes a volume that is not filtered relative to filter medium 220 and the term "filtered" describes a volume that is filtered relative to filter medium 220. However, as will be understood by those skilled in the art, filter assembly 200 may include additional filter media that filter liquid entering unfiltered volume 224. Thus, unfiltered volume 224 may be filtered relative to other filter media, such as a coarse filter, but not filter medium 220.

Filter medium 220 may be formed into a cylindrical shape. In particular, filter medium 220 may be a mesh or other material bent into the cylindrical shape. Filtered volume 222 may be positioned radially within filter medium 220, and unfiltered volume 224 may be positioned radially outside filter medium 220. Thus, e.g., wash fluid may flow along a radial direction R through filter medium 220 from unfiltered volume 224 to filtered volume 222 during operating of dishwasher appliance 100. In particular, housing 210 has an entrance 212 and a circulation outlet 214. Entrance 212 of housing 210 is contiguous or in fluid communication with unfiltered volume 224. Thus, unfiltered volume 224 is configured for receipt of liquid from sump 170, and liquid in sump 170 flows into unfiltered volume 224 via entrance 212 of housing 210. Circulation outlet 214 of housing 210 is contiguous or in fluid communication with filtered volume 222. Thus, filtered volume 222 is configured for receipt of liquid from filter medium 220, and liquid in filtered volume 222 flows from housing 210 to spray body 202 via circulation outlet 214 of housing 210. In such a manner, unfiltered liquid follows a path through filter assembly 200. In particular, unfiltered liquid passes though filter medium 220, and filtered liquid exits filter assembly 200.

Filter medium 220 can be can be configured for fine filtration—e.g. filtering of relatively small particles. Accordingly, e.g., filter medium 220 may be configured (e.g., define holes or apertures) for removing particles in the size range of about fifty microns to about four hundred microns. For example, filter medium 220 may be a screen or mesh having holes in the size range of about fifty microns to about four hundred microns. In another exemplary aspect of the present subject matter, filter medium 220 may be configured (e.g., define holes or apertures) for removing particles in the size range of about three hundred microns to about six hundred microns. For example, filter medium 220 may be a screen or mesh having holes in the size range of about three hundred microns to about six hundred microns. These size ranges are provided by way of example only. Other ranges may be used in alternative example embodiments as well.

Filter medium 220 may be mounted to housing 210. Thus, e.g., filter medium 220 may be fixed or static relative to housing 210 during operation of dishwasher appliance 100. Because filter medium 220 is fixed relative to housing 210, particles may accumulate within filter medium 220 during operating of dishwasher appliance 100. Thus, filter assembly 200 includes features for limiting or preventing the particles from clogging filter medium 220.

Figure 6:
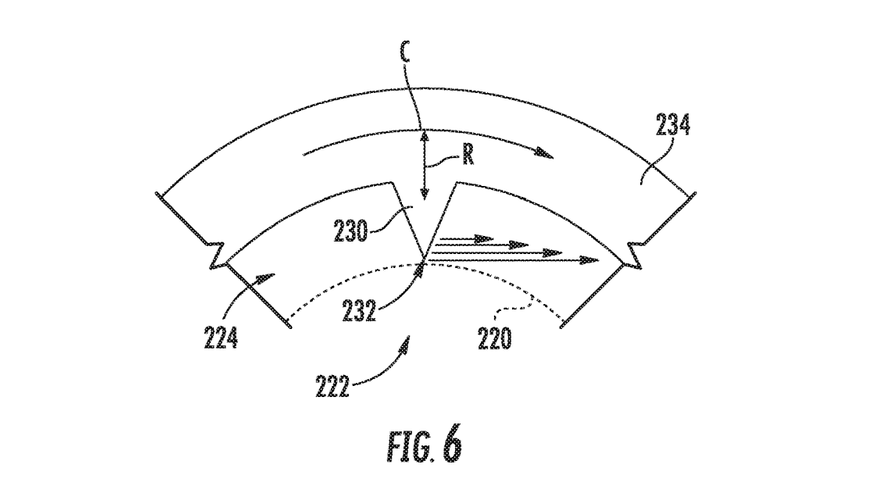
FIG. 6 is a partial, section view of a vane and a filter medium of the filter assembly of FIG. 4.

As may be seen in FIGS. 5 and 6, filter assembly 200 includes a plurality of vanes 230. Vanes 230 are distributed around filter medium 220, e.g., along a circumferential direction C, within unfiltered volume 224. In addition, vanes 230 are rotatable about filter medium 230. Thus, vanes 230 may rotate about an axial direction A such that vanes 230 move relative to filter medium 230 within unfiltered volume 224. The axial direction A may be generally horizontal in certain example embodiments. Thus, vanes 230 may be rotatable about a horizontal axis relative to filter medium 220. Such relative motion between filter medium 230 and vanes 230 can assist with limiting or preventing clogging filter medium 230 with particles.

Vanes 230 may be positioned at or proximate entrance 212 of housing 210. Thus, vanes 230 may be exposed to or positioned within the flow of wash fluid from circulation pump 154 when circulation pump 154 operates to flow wash fluid from sump 170 to filter assembly 200. As the wash fluid from circulation pump 154 impacts of flows against vanes 230, the wash fluid may cause vanes 230 to rotate about filter medium 230. Thus, vanes 230 may be hydraulically driven to rotate about filter medium 230 by wash fluid from circulation pump 154.

FIG. 6 is a partial, section view of one of vanes 230 and filter medium 220. As may be seen in FIG. 6, an edge 232 of vane 230 may be that faces and is positioned adjacent filter medium 220 is spaced from filter medium 220 along the radial direction R. Thus, vanes 230 may not contact or scrape filter medium 220. Rather, vanes 230 may generate a centrifugal force within the wash fluid in unfiltered volume 224. In turn, the motion of the wash fluid in unfiltered volume 224 generated by vanes 230 during rotation of vanes 230 relative to filter medium 220 may lift up and carry away particles from filter medium 220. In addition, shearing within the wash fluid between the vanes 230 and filter medium 220 caused by rotation of the vanes 230 about filter medium 220 may also lift up and carry away particles from filter medium 220. In certain example embodiments, edge 232 of vane 230 may be spaced from filter medium 220 along the radial direction R by no less than a sixteenth of an inch (1/16") and no more than a quarter inch (1/4") to advantageously lift up and carry away particles from filter medium 220.

Figure 7:
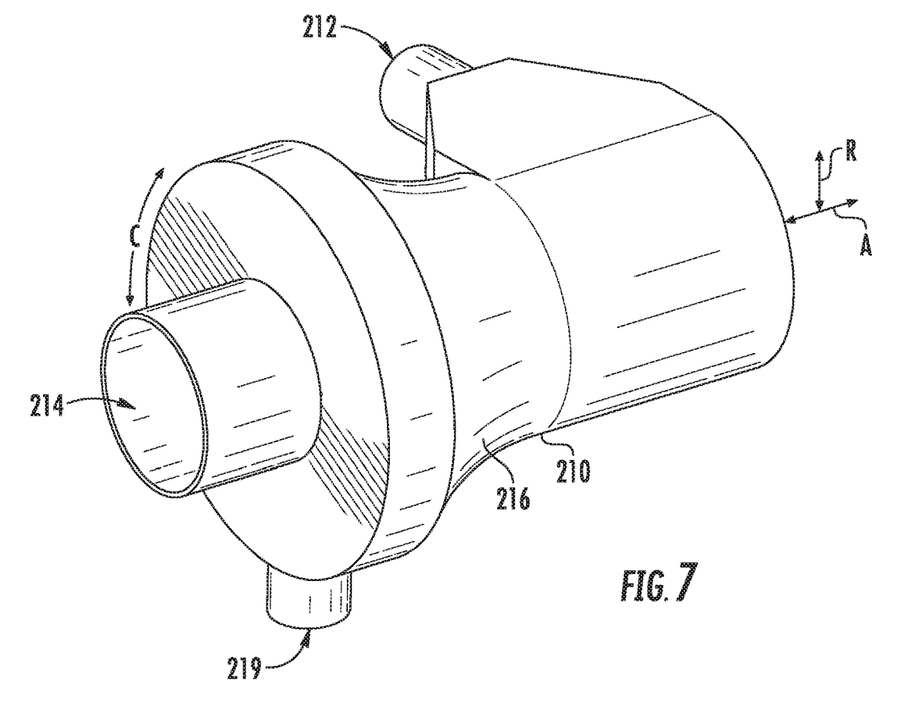
FIG. 7 is a perspective view of a housing of the filter assembly of FIG. 4.
Figure 8:
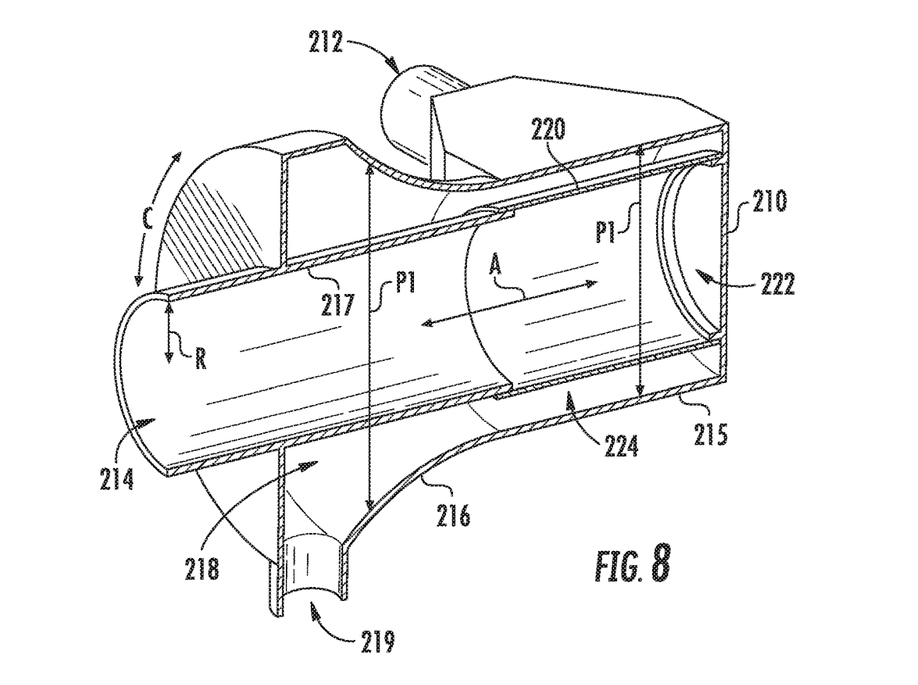
FIG. 8 is a section view of the housing of the filter assembly of FIG. 8.

FIG. 7 is a perspective view of housing 210. FIG. 8 is a section view of housing 210. As may be seen in FIGS. 7 and 8, housing 210 may include a cylindrical wall 215 and a flared wall 216. Filter medium 220 is positioned within cylindrical wall 215. Thus, cylindrical wall 215 is positioned and extends around filter medium 220 and vanes 230. In particular, vanes 230 may be positioned between cylindrical wall 215 and filter medium 220 along the radial direction R. Flared wall 216 expands from cylindrical wall 215. In particular, housing 210 has an inner diameter at both cylindrical wall 215 and flared wall 216. The inner diameter P1 of housing 210 at cylindrical wall 215 is less than the inner diameter P2 of housing 210 at flared wall 216. Thus, the interior of housing 210 may be wider at flared wall 216 than at cylindrical wall 215. Such sizing of cylindrical wall 215 relative to flared wall 216 may advantageously assist with collecting particles within housing 210 at the flared wall 216 and away from the cylindrical wall 215 and filter medium 220, as discussed in greater detail below. The inner surface of flared wall 216 may be linear, arcuate and/or curved.

As shown in FIG. 8, housing 210 may also include an inner wall 217. In the example embodiment shown in FIG. 8, inner wall 217 is positioned within flared wall 216 such that inner wall 217 extends between filter medium 220 and circulation outlet 214 of housing 210 within flared wall 216, and circulation outlet 214 of housing 210 is positioned opposite entrance 212 of housing 210 along the axial direction A on housing 210. Thus, inner wall 217 assists with separating unfiltered volume 222 from filtered volume 224 within flared wall 216. For example, unfiltered volume 222 may be positioned between flared wall 216 and inner wall 217 within housing 210, and filtered volume 224 may be positioned within inner wall 217. Accordingly, filtered fluid may flow within inner wall 217 from within filter medium 220 to circulation outlet 214 of housing 210, and inner wall 217 may block unfiltered fluid within unfiltered volume 222 at flared wall 216 from flowing to circulation outlet 214 of housing 210. Entrance 212 of housing 210 may also be positioned at or proximate a top portion of housing 210 while circulation outlet 214 of housing 210 may be positioned at or proximate a bottom portion of housing 210.

Flared wall 217 may define a collection chamber 218 for particles within unfiltered volume 222, and housing 210 may include a drain outlet 219 positioned at collection chamber 218. Collection chamber 218 may be positioned at the end of housing 210 proximate circulation outlet 214 and opposite entrance 212 of housing 210. As noted above, flared wall 216 expands from cylindrical wall 215. Thus, collection chamber 218 may wider along the radial direction R than the portion of unfiltered volume 222 within cylindrical wall 215 that contains vanes 230. In such a manner, the centrifugal force generated in the wash fluid at the portion of unfiltered volume 222 within cylindrical wall 215 by rotation of vanes 230 about filter medium 230 may lift up and carry away particles from filter medium 220, and the relatively wide flared wall 216 may generator a "cyclone" or swirl of wash fluid that carries the particles towards or into collection chamber 218. In addition, vanes 230 may be oriented such that vanes 230 lift particles from filter medium 220 and flow the particles into collection chamber 218 during rotation of vanes 230 about filter medium 220. From collection chamber 218, the particles may be evacuated from housing 210 via drain outlet 219. For example, drain pump 156 may be coupled to drain outlet 219 such that drain pump 156 is operable to flow the wash fluid and particles from collection chamber 218 out of housing 210 and towards drain 158.

Figure 9:
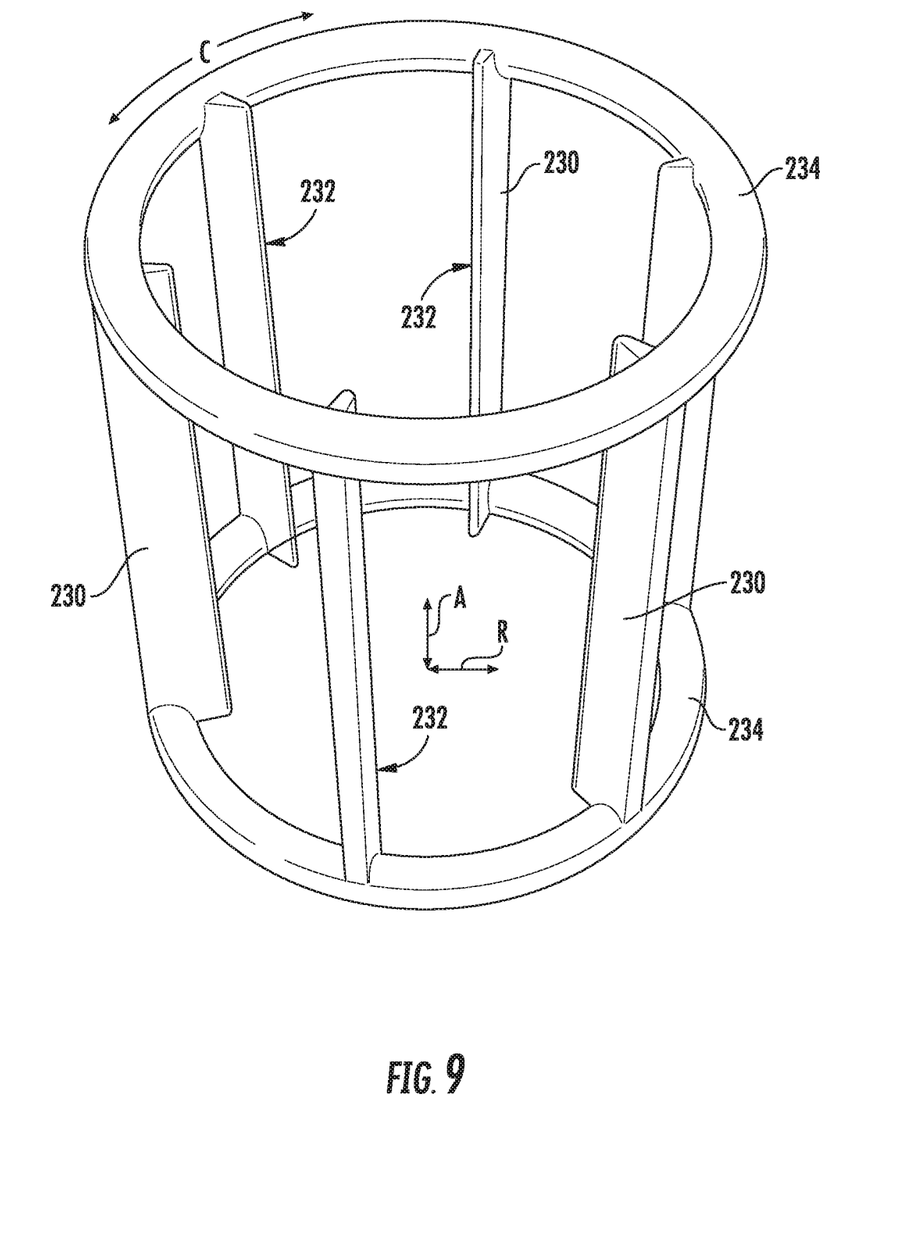
FIG. 9 is a perspective view of a plurality of vanes of the filter assembly of FIG. 4.

FIG. 9 is a perspective view of vanes 230. As shown in FIG. 9, vanes 230 may include no less than six vanes, e.g., eight vanes. In alternative example embodiments, filter assembly 200 may have another suitable number of vanes, e.g., six vanes, seven vanes, nine vanes, ten vanes, etc. Vanes 230 may be uniformly distributed along the circumferential direction C. Thus, vanes 230 may be uniformly distributed about filter medium 220 along the circumferential direction C. A pair of rings 234 may connect vanes 230, e.g., such that vanes 230 are fixed relative to one another. Each ring 230 may be positioned at a respective opposite end of vanes 230 along the axial direction A. In the example embodiment shown in FIG. 9, vanes 230 extend rectilinearly along the axial direction A. In alternative example embodiments, vanes 230 may be curved or angled along the axial direction A.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance, comprising:
a tub defining a wash chamber;
a spray body positioned within the wash chamber of the tub;
a pump operable to flow wash fluid to the spray body; and
a filter assembly positioned between the pump and the spray body along a flow path between the pump and the spray body, the filter assembly comprising
a housing defining an inlet and a recirculation outlet, the inlet of the housing coupled to the pump such that unfiltered wash fluid from the pump enters the housing at the inlet of the housing during operation of the pump, the recirculation outlet of the housing coupled to the spray body such that filtered wash fluid exits the housing towards the spray body at the recirculation outlet of the housing during operation of the pump;
a cylindrical filter medium positioned within the housing proximate the inlet of the housing; and
a plurality of vanes distributed around the cylindrical filter medium, the plurality of vanes rotatable about the cylindrical filter medium,
wherein the housing comprises a cylindrical wall and a flared wall, the cylindrical wall positioned around the cylindrical filter medium and the plurality of vanes, the flared wall expanding from the cylindrical wall.

2. The dishwasher appliance of claim 1,
wherein an edge of each of the plurality of vanes facing the cylindrical filter medium is spaced from the cylindrical filter medium along a radial direction.

3. The dishwasher appliance of claim 1, wherein the plurality of vanes is rotatable about a horizontal axis relative to the cylindrical filter medium.

4. The dishwasher appliance of claim 1, wherein the housing comprises an inner wall, the inner wall extending between the cylindrical filter medium and the recirculation outlet of the housing within the flared wall.

5. The dishwasher appliance of claim 4, wherein the flared wall defines a collection chamber, the housing comprising a drain outlet positioned at the collection chamber.

6. The dishwasher appliance of claim 5, wherein an edge of each of the plurality of vanes facing the cylindrical filter medium is spaced from the cylindrical filter medium along a radial direction, the plurality of vanes oriented such that the plurality of vanes lift particles from the cylindrical filter medium and flow the particles into the collection chamber during rotation of the plurality of vanes about the cylindrical filter medium.

7. The dishwasher appliance of claim 1, wherein the housing defines an inner diameter, the inner diameter of the housing at the flared wall greater than the inner diameter of the housing at the cylindrical wall.

8. The dishwasher appliance of claim 1, wherein the cylindrical filter medium defines a plurality of holes that extend through the cylindrical filter medium, each of the plurality of holes sized for filtering particles in a range between no less than fifty microns and no greater than eight hundred microns.

9. The dishwasher appliance of claim 1, wherein the plurality of vanes comprises no less than six vanes, the plurality of vanes uniformly distributed about the cylindrical filter medium along a circumferential direction.

10. A dishwasher appliance, comprising:
a tub defining a wash chamber;
a spray body positioned within the wash chamber of the tub;
a pump operable to flow wash fluid to the spray body; and
a filter assembly positioned between the pump and the spray body along a flow path between the pump and the spray body, the filter assembly comprising
a housing defining an inlet and a recirculation outlet, the inlet of the housing coupled to the pump such that unfiltered wash fluid from the pump enters the housing at the inlet of the housing during operation of the pump, the recirculation outlet of the housing coupled to the spray body such that filtered wash fluid exits the housing towards the spray body at the recirculation outlet of the housing during operation of the pump;
a cylindrical filter medium mounted within the housing proximate the inlet of the housing such that the cylindrical filter medium is fixed relative to the housing, the cylindrical filter medium defining a plurality of holes that extend through the cylindrical filter medium, each of the plurality of holes sized for filtering particles in a range between no less than fifty microns and no greater than six hundred microns; and
a plurality of vanes distributed around the cylindrical filter medium, the plurality of vanes rotatable about the cylindrical filter medium,
wherein the housing comprises a cylindrical wall and a flared wall, the cylindrical wall positioned around the cylindrical filter medium and the plurality of vanes, the flared wall expanding from the cylindrical wall.

11. The dishwasher appliance of claim 10, comprising:
wherein an edge of each of the plurality of vanes facing the cylindrical filter medium is spaced from the cylindrical filter medium along a radial direction.

12. The dishwasher appliance of claim 1, wherein the plurality of vanes is rotatable about a horizontal axis relative to the cylindrical filter medium.

13. The dishwasher appliance of claim 10, wherein the housing comprises an inner wall, the inner wall extending between the cylindrical filter medium and the recirculation outlet of the housing within the flared wall.

14. The dishwasher appliance of claim 13, wherein the flared wall defines a collection chamber, the housing comprising a drain outlet positioned at the collection chamber.

15. The dishwasher appliance of claim 14, wherein an edge of each of the plurality of vanes facing the cylindrical filter medium is spaced from the cylindrical filter medium along a radial direction, the plurality of vanes oriented such that the plurality of vanes lift particles from the cylindrical filter medium and flow the particles into the collection chamber during rotation of the plurality of vanes about the cylindrical filter medium.

16. The dishwasher appliance of claim 10, wherein the housing defines an inner diameter, the inner diameter of the housing at the flared wall greater than the inner diameter of the housing at the cylindrical wall.

17. The dishwasher appliance of claim 10, wherein the plurality of vanes comprises no less than six vanes, the plurality of vanes uniformly distributed about the cylindrical filter medium along a circumferential direction.

18. The dishwasher appliance of claim 1, wherein the edge of each of the plurality of vanes facing the cylindrical filter medium is spaced from the cylindrical filter medium along the radial direction by no less than a sixteenth of an inch and no more than a quarter inch.

19. The dishwasher appliance of claim 11, wherein the edge of each of the plurality of vanes facing the cylindrical filter medium is spaced from the cylindrical filter medium along the radial direction by no less than a sixteenth of an inch and no more than a quarter inch.

\* \* \* \* \*